UNITED STATES PATENT OFFICE.

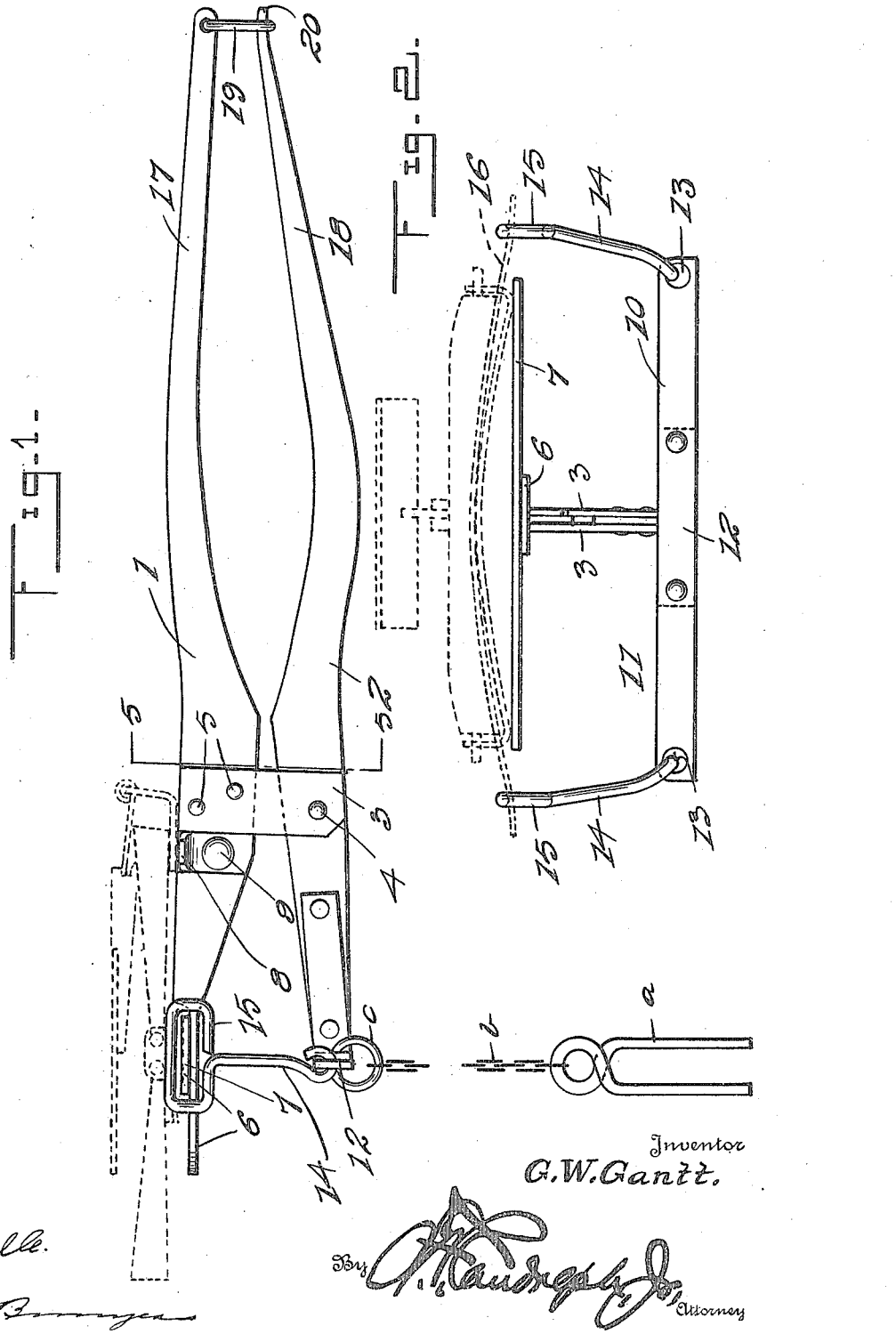

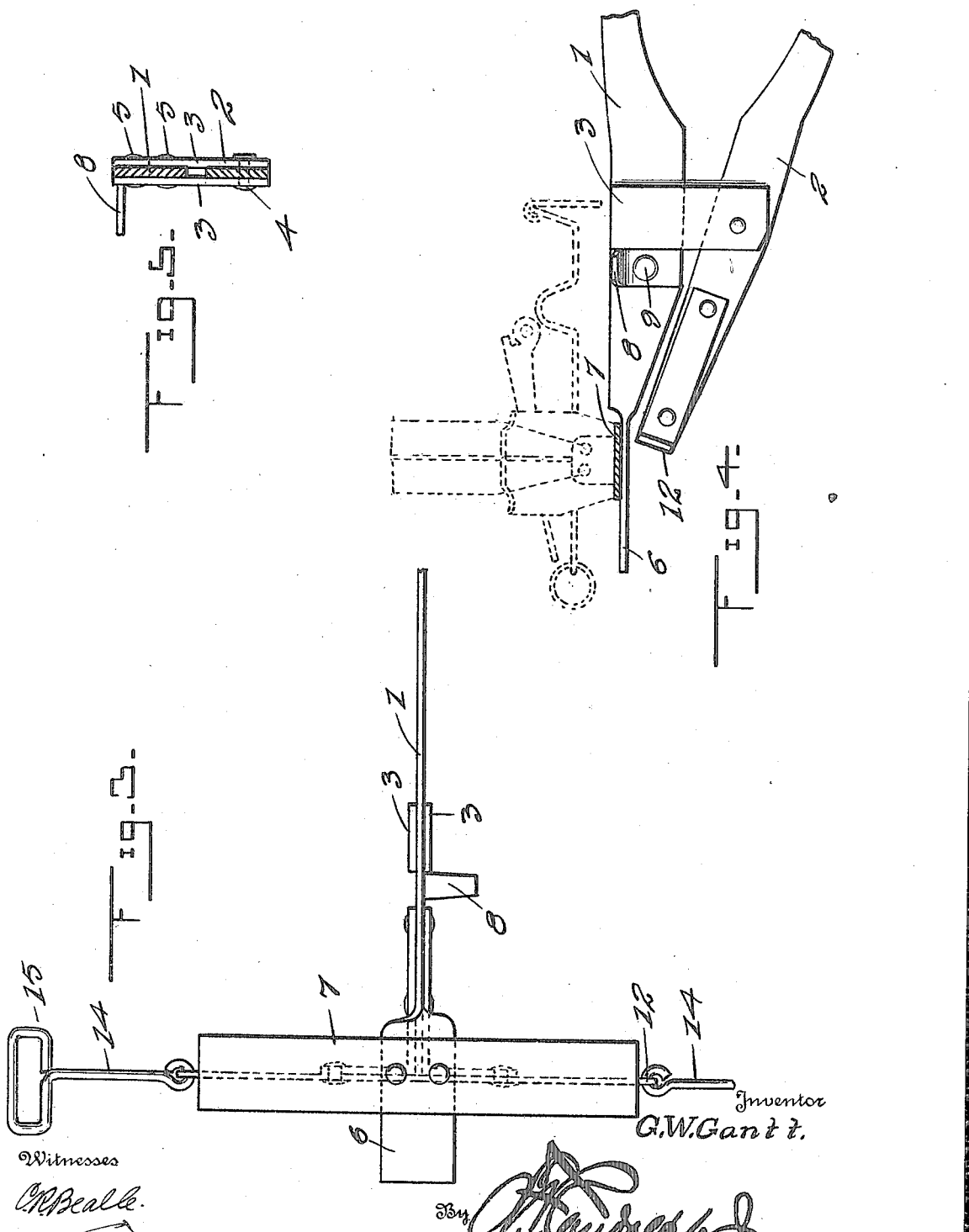

GEORGE W. GANTT, OF MOUNT AIRY, NORTH CAROLINA.

TRAP-SETTING DEVICE.

1,180,130. Specification of Letters Patent. Patented Apr. 18, 1916.

Application filed May 19, 1915. Serial No. 29,118.

*To all whom it may concern:*

Be it known that I, GEORGE W. GANTT, a citizen of the United States, residing at Mount Airy, in the county of Surry and State of North Carolina, have invented certain new and useful Improvements in Trap-Setting Devices; and I do hereby declare the following to be a full, clear, and exact description of the invention, such as will enable others skilled in the art to which it appertains to make and use the same.

This invention relates to trap setting devices, designed more particularly for use in setting the ordinary steel jaw traps, and one of the principal objects of the invention is to provide a device of simple construction which will render it perfectly safe to hold the spring in such position on a steel trap that the jaws may be opened and the trigger set without danger of injury to the operator.

Another object of the invention is to provide a trap setting device which will set different sizes of traps, which will be simple in construction, efficient in operation, and which cannot readily get out of order.

The foregoing and other objects may be attained by means of the construction illustrated in the accompanying drawings, in which—

Figure 1 is a side elevation of a trap setting device made in accordance with this invention, and showing a steel trap in dotted lines. Fig. 2 is a front end elevation showing the manner of connecting the trap setting device to the spring of a steel trap. Fig. 3 is a top plan view of a portion of the trap. Fig. 4 is a longitudinal sectional view of the trap, and Fig. 5 is a detail sectional view taken on the line 5—5 of Fig. 1.

Referring to the drawings, the numeral 1 designates one of the members of the trap setting device, and 2 is the other member thereof, said members being connected together by means of the spaced plates 3 and the member 2 being pivoted between said plates on the pivotal point 4, while the plate 1 is connected to the plates 3 by suitable bolts 5. The front end of the member 1 is bent at right angles to form a flat plate 6, and secured to said flat plate is a transverse bearing member 7. A supporting lug 8 is connected to the member 1 and extends at right angles thereto, said supporting lug being connected to the member 1 by a bolt or rivet 9.

The member 2 is provided at its front end with a cross bar comprising three plates 10, 11 and 12 and connected to the plates 10 and 11 through openings 13 are pivoted arms 14, said arms having at their upper ends rectangular loops 15, designed to engage the ends of the spring 16, shown in dotted lines in Fig. 2. The members 1 and 2 are provided with comparatively long handles 17 and 18, and connected to the handle 17 is a ring 19 adapted to engage the projecting end 20 of the member 19 when the handles are brought together to hold the spring 16 of the trap down, so that the jaws of the trap can be moved in safety. A key $a$ is connected by means of a chain $b$ to a ring $c$ to the plate 12. The key $a$ is for the purpose of holding one end of a smaller single spring trap, when one end of the trap is connected by the link 14.

The operation of the invention may be briefly described as follows: The loops 15 are engaged with the ends of the spring 16, and when the handle members 17 and 18 are brought together and the ring 19 engaged with the handle member 18, the spring 16 is held in such position that the jaws of the trap can be easily opened and the trigger may be engaged with the pan. To disengage the trap setting device from the trap, the ring 19 is disengaged from the projection 20 and when the jaw members are closed, the loops 15 may be readily removed from the spring leaving the trap in set condition.

Various changes may be made in the details of construction without departing from the spirit and scope of the invention as defined in the claims.

What is claimed is:—

1. A trap setting device comprising a pair of handles, one handle being pivoted to spaced plates connected to the other handle member, and one of said handle members having a supporting plate and the other member having a pair of arms provided with rectangular loops to engage the opposite ends of the spring of the steel trap, and a loop connected to the end of one of the handles to engage a projection upon the other handle to hold the spring in such condition that the trap may be set.

2. A trap setting device comprising two handle members, one of said handle members being pivoted to the other and one of said members having a supporting plate connected thereto, the other member having a pair of arms pivoted thereto, and said arms being provided with rectangular loops to engage the opposite ends of the spring of a steel trap, and means for holding said spring in condition to permit the jaws to be opened and the trigger to be set.

3. A trap setting device comprising a pair of pivotally connected members, trap supporting means carried by one of said members, and trap spring engaging elements pivotally connected to the other of said members.

In testimony whereof I affix my signature in presence of two witnesses.

GEORGE W. GANTT.

Witnesses:
 RICHARD SHELTON,
 J. E. MONDAY.

Copies of this patent may be obtained for five cents each, by addressing the "Commissioner of Patents, Washington, D. C."